(12) United States Patent
Charbonnet

(10) Patent No.: US 10,710,808 B2
(45) Date of Patent: Jul. 14, 2020

(54) SYSTEM FOR CONTROLLED DISTRIBUTION OF COMPONENTS

(71) Applicant: ETA SA Manufacture Horlogere Suisse, Grenchen (CH)

(72) Inventor: Frederic Charbonnet, Basse-Nendaz (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 16/211,265

(22) Filed: Dec. 6, 2018

(65) Prior Publication Data
US 2019/0193943 A1   Jun. 27, 2019

(30) Foreign Application Priority Data

Dec. 21, 2017 (CH) ...................................... 1597/17

(51) Int. Cl.
*B65G 27/16* (2006.01)
*B65G 47/34* (2006.01)
(Continued)

(52) U.S. Cl.
CPC ............. *B65G 27/16* (2013.01); *B65G 27/04* (2013.01); *B65G 27/34* (2013.01); *B65G 47/34* (2013.01);
(Continued)

(58) Field of Classification Search
CPC ........ B65G 27/16; B65G 47/34; B65G 51/03; B65G 2201/02; B65G 2812/0348; B65G 2812/0392; B65G 27/04; B65G 27/34
(Continued)

(56) References Cited

U.S. PATENT DOCUMENTS 2,444,134 A   6/1948 Hittson
3,224,553 A   12/1965 Campbell
(Continued)

FOREIGN PATENT DOCUMENTS

EP   0299216 A1 *   1/1989   ............ B65G 27/34
JP   8-71865   3/1996
WO   WO 2016/115584 A1   7/2016

OTHER PUBLICATIONS

"Patent Translate Description Description WO2016115584", EPO and Google. (Year: 2019).*
(Continued)

*Primary Examiner* — Mark A Deuble
(74) *Attorney, Agent, or Firm* — Oblon, McClelland, Maier & Neustadt, L.L.P.

(57) ABSTRACT

A system for assembly of components, including a vibrating device wherein the components are placed in bulk, which is provided with first and second compartments connected together at their ends by first and second passage zones to form a closed circuit wherein the components can flow, and an articulated gripping arm provided to distribute the components to an automatic assembly installation, the vibrating device including first and second planes inclined in opposite directions included, respectively, in the first and second compartments, the components being able to progress along the first and second inclined planes towards a supply platform on which at least one component can be arranged in advance of its seizure by the articulated gripping arm, the supply platform being located in the second compartment at an exit of the second inclined plane.

19 Claims, 3 Drawing Sheets

(51) Int. Cl.
*B65G 51/03* (2006.01)
*B65G 27/04* (2006.01)
*B65G 27/34* (2006.01)

(52) U.S. Cl.
CPC .......... *B65G 51/03* (2013.01); *B65G 2201/02* (2013.01); *B65G 2812/0348* (2013.01); *B65G 2812/0388* (2013.01)

(58) Field of Classification Search
USPC ........................................................ 198/771
See application file for complete search history.

(56) References Cited

U.S. PATENT DOCUMENTS

| | | | | |
|---|---|---|---|---|
| 4,844,240 A * | 7/1989 | Hutter | ................ | B65G 47/1492 198/391 |
| 5,103,962 A * | 4/1992 | Voss | ................... | B65G 47/1492 198/391 |
| 6,116,409 A * | 9/2000 | Yokajty | .............. | B65G 47/1492 198/539 |
| 7,810,632 B2 * | 10/2010 | Ohashi | ................... | B65G 27/30 198/720 |
| 8,895,305 B2 * | 11/2014 | Repetti | .............. | C12N 15/8273 435/320.1 |
| 2003/0066735 A1 | 4/2003 | Sullivan, Jr. | | |
| 2009/0260954 A1 | 10/2009 | Patterson et al. | | |
| 2017/0305678 A1* | 10/2017 | Motowaki | .............. | B25J 9/0093 |

OTHER PUBLICATIONS

European Search report dated Aug. 2, 2018 in European application 18153495 (with English translation of categories of cited documents).

* cited by examiner

SYSTEM FOR CONTROLLED DISTRIBUTION OF COMPONENTS

CROSS-REFERENCE TO RELATED APPLICATION

This application claims priority to Swiss Patent Application No. 01597/17 filed on Dec. 21, 2017, the entire disclosure of which is hereby incorporated herein by reference.

TECHNICAL FIELD

The present invention relates to a system for controlled distribution of components, particularly components for timepieces, for an installation for automatic assembly of all or part of an article produced from at least one of these components, particularly of a timepiece, and such an automatic assembly installation.

PRIOR ART

In the prior art it is known to use a vibrating bowl in a system for distributing components, for example components for timepieces, as in the context of an installation for automatic assembly of timepieces. Such a bowl is conventionally mounted on a support that generates vibrations that impart to these components for timepieces, which are generally lightly oiled, a rotational movement about a vertical axis of revolution of this bowl. Such a movement leads these components for timepieces to embark upon a ramp defined on the lateral wall of the bowl and progressively to rise to the top of this wall. In this configuration, the components arriving at this top may then embark upon a supply channel defined in the continuation of this ramp while being fixed to this lateral wall of the bowl. This supply channel extends longitudinally in a direction parallel to a tangent to an external peripheral wall of this bowl perpendicular to a plane comprising the vertical axis of revolution of this bowl. Such a channel aims to supply a distribution support defined at the top of the wall and extending towards the exterior of the bowl on which are arranged the components coming from the channel and which are to be seized by a gripping arm in order to be distributed to an assembly machine of the automatic assembly installation in advance of the production of all or part of a timepiece.

However, such systems for distributing components for timepieces often lack reliability in the context of the way in which they function. Indeed, they are regularly subject to malfunctions that may result from an excessive accumulation of components on the ramp or, alternatively, at the supply channel arising from jamming in this channel caused by these lightly oiled components or components of imperfect geometry. In such circumstances, manual intervention is systematically required in order to set the system running again.

Furthermore, it will be noted that, in these distribution systems, the components for timepieces that are not correctly seized by the gripping arm systematically fall outside the vibrating bowl, which gives rise to losses that have an impact on a not insignificant increase in the costs of production of such timepieces.

SUMMARY OF THE INVENTION

An object of the present invention is thus to propose a system for controlled distribution of components, particularly components for timepieces, which makes it possible to overcome the prior-art drawbacks by improving the reliability of the vibrating device constituting this system.

To this end, the invention relates to a system for controlled distribution of components, particularly components for timepieces, for an installation for automatic assembly of all or part of an article produced from at least one of these components, particularly of a timepiece, the system comprising:
  a vibrating device in which said components are placed in bulk, which is provided with first and second compartments connected together at their ends by first and second passage zones of this device such as to form a closed circuit in which the components can flow, and
  an articulated gripping arm provided to distribute said components to said automatic assembly installation,
the vibrating device comprising first and second planes inclined in opposite directions included, respectively, in the first and second compartments, said components being able to progress along the first and second inclined planes towards a supply platform on which at least one component can be arranged in advance of its seizure by the articulated gripping arm, said supply platform being located in the second compartment at an exit of the second inclined plane.

In other embodiments:
  the supply platform is arranged in the second compartment in the continuation of the second inclined plane while being mechanically connected to this second inclined plane;
  the supply platform extends longitudinally between the exit of the second inclined plane and the second passage zone;
  the supply platform comprises first and second parts;
  the first part has a length greater or substantially greater than a length of the second part, and a width smaller or substantially smaller than a width of the second part;
  the first part comprises a planar upper face forming a support on which the components can move with a view to their seizure by the articulated gripping arm;
  the first part extends in a rectilinear manner while having its upper face included in a plane comprising a planar surface of the second inclined plane;
  the first part of the supply platform comprises the upper face provided with a distribution zone included substantially at its free end and in which zone the component is arranged in advance of its seizure by the articulated gripping arm;
  the upper face is at a different level relative to a base of the second compartment while being arranged in this second compartment above this base;
  the first part of the supply platform comprises a device for detecting the presence of the component arranged in the distribution zone;
  the second part of the supply platform comprises two guide portions;
  the guide portions are defined in order to direct the components towards lateral walls of the second compartment, at least one component initially present on the first part of this supply platform and discharged therefrom;
  the vibrating device comprises a device for sorting/selecting the components defined close to the first part of the supply platform, which is particularly suitable for directing a stream of fluid, such as air, towards an upper face of the first part;
  the vibrating device comprises a device for separating at least two components arranged above the distribution zone;

the first passage zone comprises the ends of the first and second compartments and also a difference in level present between the first and second inclined planes defined in these ends with the first inclined plane which is located above the second inclined plane;

the second passage zone comprises the ends of the first and second compartments and also a difference in level present between the first inclined plane and the base defined in these ends with the base which is located above the first inclined plane;

the first passage zone comprises a hatch provided in order to close/open an opening made in the second inclined plane allowing discharge of the components from the vibrating device; and the component is selected from components, particularly comprising axisymmetric objects of millimetric size.

The invention also relates to an installation for automatic assembly of all or part of an article produced from at least one component, particularly of a timepiece, comprising at least one such system for controlled distribution of components.

Thus, by virtue of these features, the distribution system therefore makes it possible to improve the circulation of the components, particularly components for timepieces, in the vibrating device and also the optimization of the sorting of these latter by dispensing with a supply channel but providing a supply platform which is thus uncovered. Furthermore, the losses and damage caused to these components are limited or are practically zero owing to systematic recovery of the components progressing over the supply platform that are not seized by the articulated gripping arm.

BRIEF DESCRIPTION OF THE FIGURES

Other features and advantages of the present invention will become apparent upon reading a number of embodiments, given solely by way of non-limiting example and with reference to the appended drawings, in which.

DETAILED DESCRIPTION OF THE INVENTION

Figure 1:
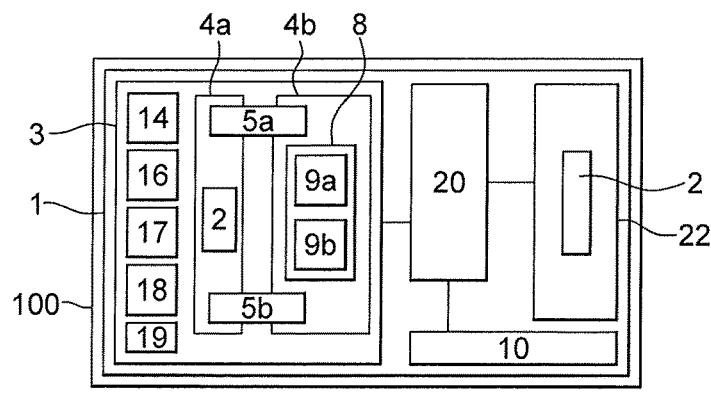
FIG. 1 is a schematic representation relating to a system for controlled distribution of components for timepieces for an installation for automatic assembly of all or part of a timepiece, according to one embodiment of the invention.
Figure 2:
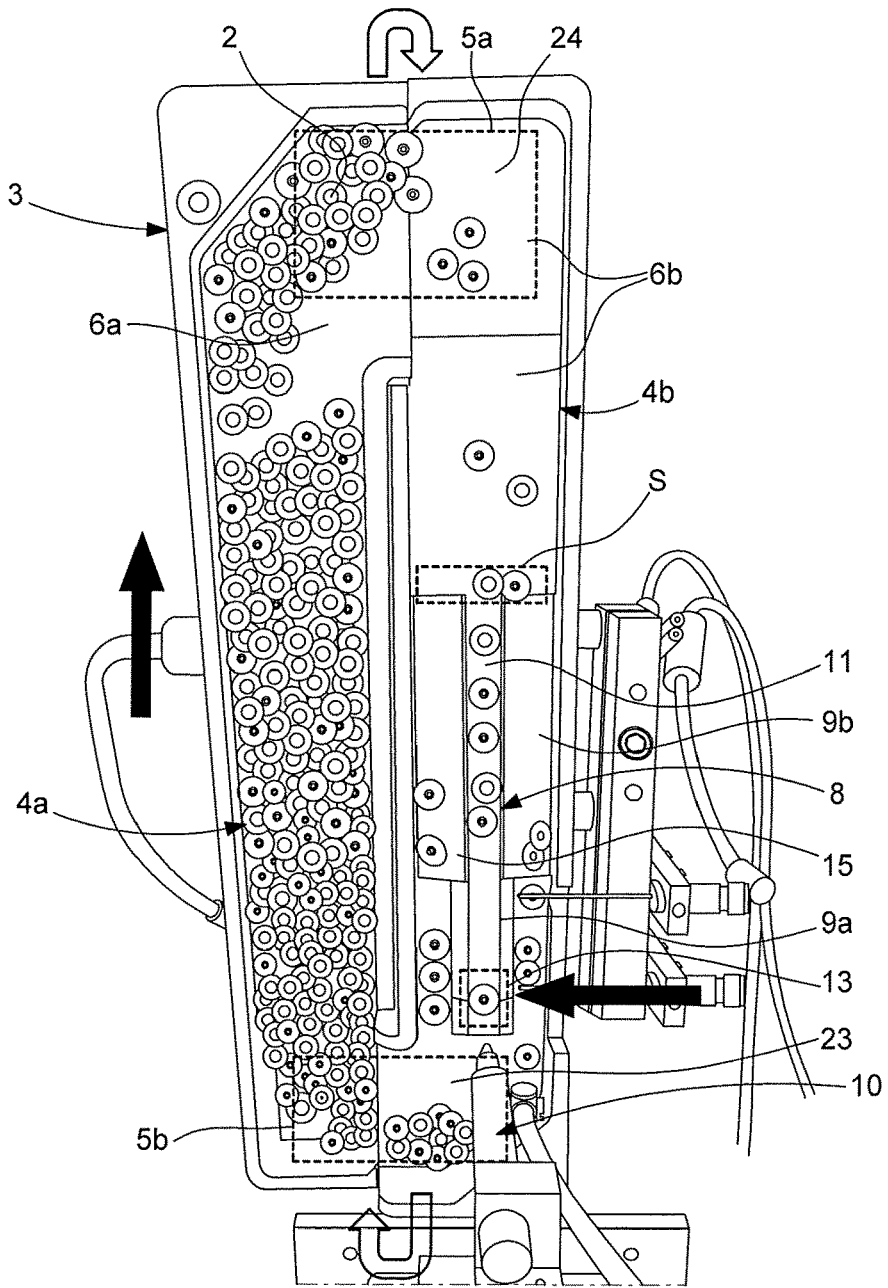
FIGS. 2 to 5 are views of a vibrating device of the distribution system, according to the embodiment of the invention.
Figure 3:
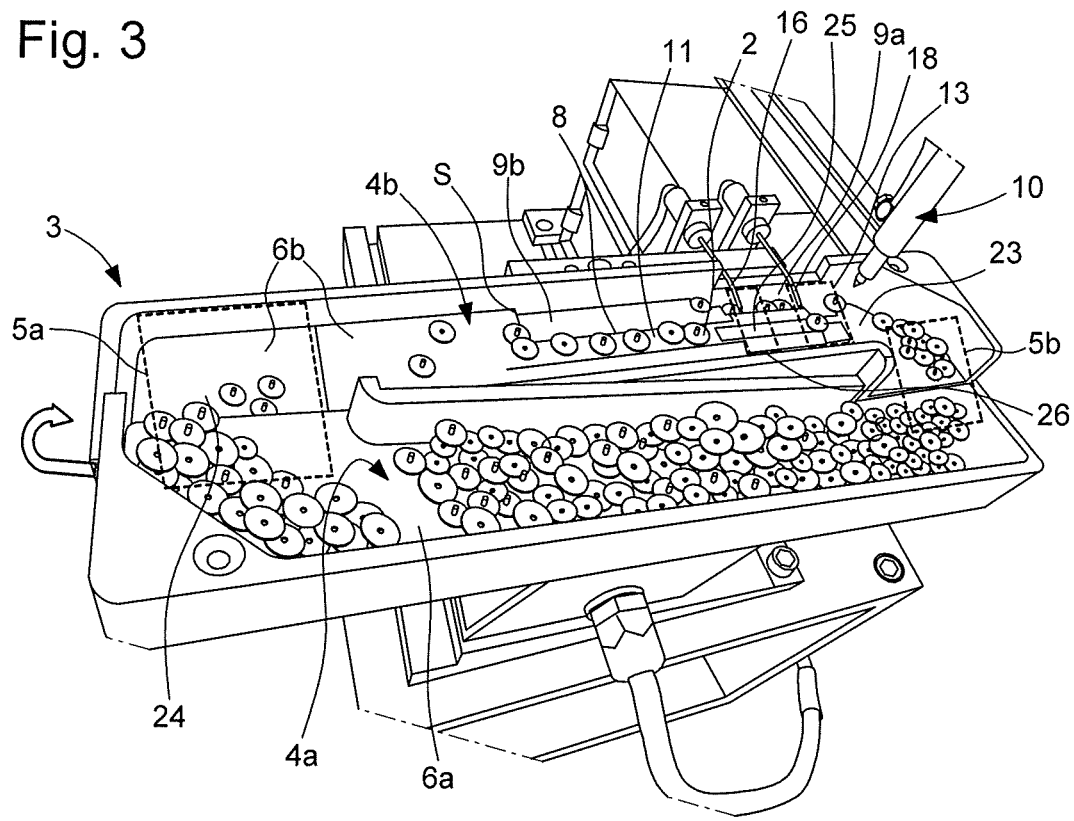
Figure 4:
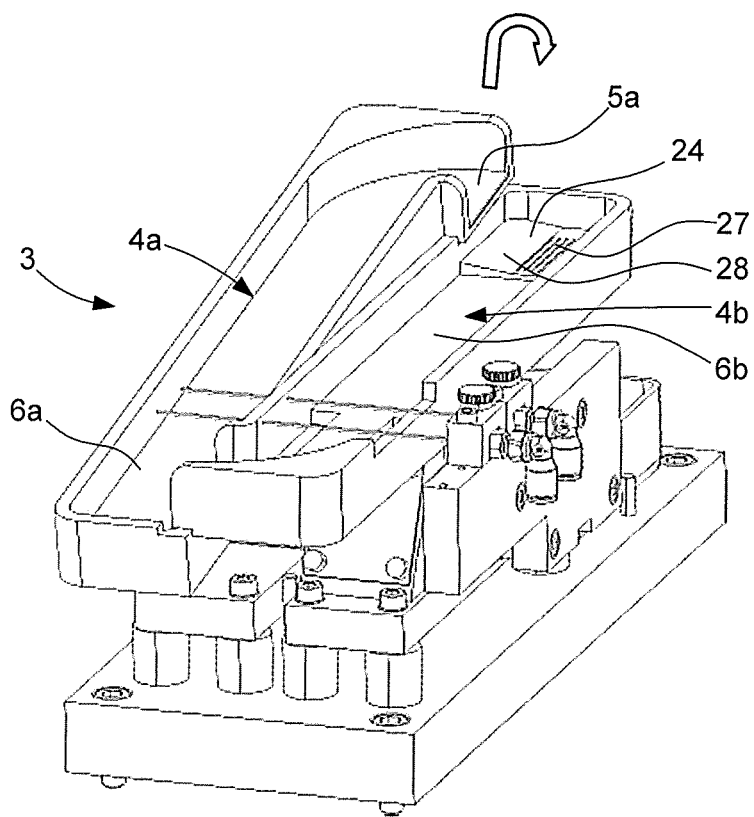
Figure 5:
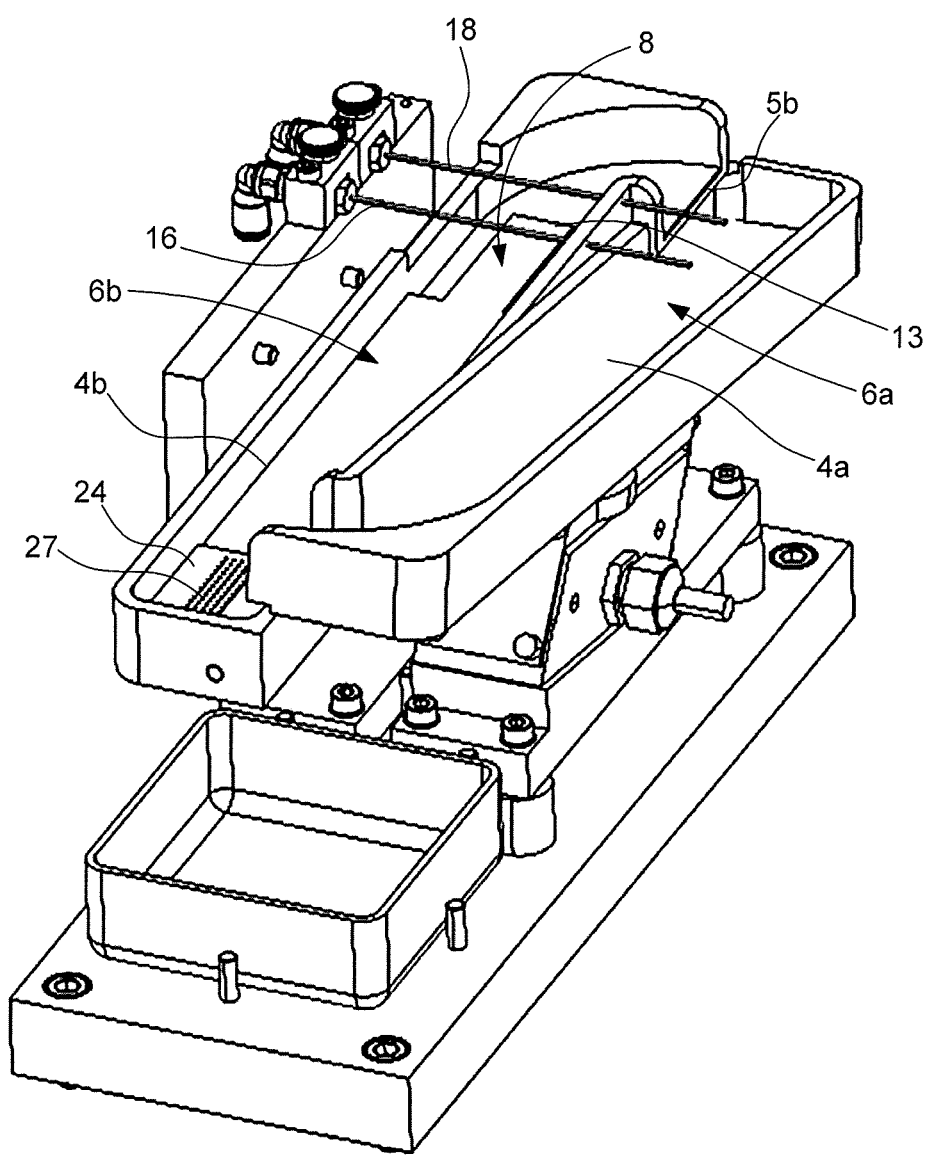

With reference to FIG. 1, the system 1 for controlled distribution of components 2, particularly of components 2 for timepieces, comprises a vibrating device 3 and an articulated gripping arm 10 and also a control unit 20 involved wholly or partly in the functioning of this system 1.

In the present embodiment of the invention, the distributed components 2 are components 2 for timepieces. It will be understood that any type of component whatsoever may be distributed by this system 1, particularly when it is an object of millimetric size, particularly of less than 20 mm. In this context, such a system 1 is provided to distribute components 2 for timepieces to a machine of an automatic assembly installation 100 or line for automatic assembly of all or part of a timepiece. It will be noted that the components 2 for timepieces distributed in this system 1 are preferably axisymmetric objects of millimetric size, particularly of less than 20 mm.

In FIGS. 2 to 5, this device 3 is provided with first and second compartments 4a, 4b connected together at their ends by first and second passage zones 5a, 5b of this device 3 such as to form a closed circuit in which the components 2 for timepieces can flow. Each of these two compartments 4a, 4b comprises front, rear and lateral walls, the lateral walls being provided with openings at the passage zones 5a, 5b. In this device 3, the components 2 for timepieces are placed in bulk in the first compartment 4a. In this system 1, this device 3 is caused to vibrate relative to its fixed pedestal by means of electromechanical elements 19 that are not detailed here.

In this system, the first passage zone 5a comprises the ends of the first and second compartments 4a, 4b and also a difference in level present between the first and second inclined planes 6a, 6b defined in these ends with the first inclined plane 6a which is located above the second inclined plane 6b. In the case of the second passage zone 5b, this comprises ends of the first and second compartments 4a, 4b and also a difference in level present between the first inclined plane 6a and a base 23 of the second compartment 4b defined in these ends with the base 23 which is located above the first inclined plane 6a. These first and second passage zones 5a, 5b are included in portions of the circuit formed in this device 3 that correspond to curves that the components 2 for timepieces have to travel. These first and second passage zones 5a, 5b thus play a part in making this device more compact. It will be noted that this first passage zone 5a may comprise an inclined portion 28 for guiding the components 2 for timepieces towards the centre of the second compartment 4b.

Such a device 3 comprises first and second planes 6a, 6b inclined in opposite directions included, respectively, in the first and second compartments 4a, 4b. In the first compartment 4a, the first inclined plane 6a is formed by the base of the first compartment 4a. This base may, furthermore, comprise a removable liner that makes it possible to facilitate the movement/the progression of the components 2 for timepieces in this first compartment 4a.

Such first and second inclined planes 6a, 6b contribute to ensuring the progress of the components 2 for timepieces initially tipped in bulk into this device 3 from the base towards the exit S of the second inclined plane 6b which opens out on a supply platform 8. More precisely, the electromechanical elements 19 make it possible to confer a vibrating movement on the device 3 in order to cause the components 2 for timepieces contained in the device 3 to travel, particularly one after another, along the first and second inclined planes 6a, 6b towards this supply platform 8. These planes 6a, 6b are inclined relative to one another.

In this device 3, the supply platform 8, otherwise called a slide, is arranged in the device 3 in order to receive the components 2 for timepieces coming from the second inclined plane 6b and to play a part in a selection/sorting of these components 2 for timepieces that do not have an expected orientation that is likely to ensure that they will be optimally seized by the articulated gripping arm 10 in advance of their distribution in the installation 100 for automatic assembly of all or part of a timepiece.

Such a supply platform 8 is connected to the exit S of the second inclined plane 6b, being arranged in the continuation of this second inclined plane 6b. This supply platform 8 is preferably made as a single piece with the second inclined plane 6b. It will, however, be noted that this supply platform 8 may be an added piece fixed to this second inclined plane 6*b* at its exit S. In this device 3, this supply platform 8 extends longitudinally between the exit S of the second inclined plane 6*b* and the second passage zone 5*b*. More precisely, the supply platform 8 is arranged equidistantly from the lateral walls of the second compartment 4*b*. Moreover, the supply platform 8 extends longitudinally in the second compartment 4*b*, while having a free end included between the exit S of the second inclined plane 6*b* and the second passage zone 5*b*.

Such a supply platform 8 comprises first and second parts 9*a*, 9*b* having different functions within the context of the functioning of this device 3. In this configuration, the first part 9*a* has:

- a length greater or substantially greater than a length of the second part 9*b*, and
- a width smaller or substantially smaller than a width of the second part 9*b*.

This first part 9*a* comprises a planar upper face 11 forming a support on which the components 2 for timepieces coming from the second inclined plane 6*b* can move with a view to their seizure by the articulated gripping arm 10. It will be noted that such an upper face 11 may comprise a groove 25 (visible in FIG. 3) extending longitudinally in this face in order to play a part in a configuration of the orientation of the component 2 for timepieces in advance of its seizure by the gripping arm 10 or, alternatively, in order to guide the movement thereof over this first part 9*a*. Such an upper face 11 extends in a rectilinear manner while having its upper face 11 included in a plane comprising a planar surface of the second inclined plane 6*b*. This first part 9*a* comprises the free end provided with a distribution zone 13 of the component to be seized by the articulated gripping arm 10. It will be noted that the upper face 11 is at a different level relative to a base 23 of the second compartment 4*b* while being arranged in this second compartment 4*b* above this base 23.

In this supply platform 8, the second part 9*b* comprises two guide portions 15. This second part 9*b* is made as a single piece with the first part 9*a*, having the two guide portions 15 defined on a part of the lateral sides of the first part 9*a*. In this configuration, each guide portion 15 extends transversely from a lateral side of the first part 9*a* towards the corresponding lateral wall of the second compartment 4*b*. More precisely, these two guide portions 15 extend longitudinally between the exit S of the second inclined plane 6*b* and a sorting/selection zone 26 included on the upper face 11 of the first part 9*a*. The lateral ends of these two guide portions 15 are arranged in the immediate vicinity of the lateral walls of the second compartment 4*b* or even in contact with these walls. These two guide portions 15 thus connected to the first part 9*a* have, with this latter, a cross section of essentially trapezoidal form with the two guide portions 15 that each form an obtuse angle with the first part 9*a*. These guide portions 15 are provided in order to direct the one or more components 2 for timepieces that have been discharged from this platform 8, particularly by a sorting/selection device 16 described below. These guide portions 15 make it possible, under these conditions, systematically to orient these components 2 in the second compartment 4*b* irrespective of the lateral side of the upper face 11 of the platform 8 that they have been caused to straddle in order to reach this second compartment 4*b*.

It will be noted, as an alternative, that the first part 9*a* may be a planar plate having a cross section that is preferably rectangular, and comprising, in addition to the upper face 11, a preferably planar lower face. In this configuration, the second part 9*b* may comprise, in addition to the guide portions 15, a linking portion that is connected mechanically to the lower face of the first part 9*a* of the supply platform 8. In this context, the lower face of the first part 9*a* may be mechanically connected to the linking portion of the second part 9*b* by welding, adhesive bonding or, alternatively, nesting.

As previously stated, the device 3 also comprises a device 14 for detecting the presence of the component 2 for timepieces arranged in the distribution zone 13 of the supply platform 8. Such a detector 14 comprises, for example, at least one vacuum pressure sensor and/or at least one optical sensor. This presence detector 14 is preferably arranged in the supply platform 8, in particular at this distribution zone 13.

This device 3 also comprises a device 16 for sorting/selecting components 2 for timepieces positioned in the vicinity of the sorting/selection zone 26 (visible in FIG. 3) defined in the upper face 11 of the first part 9*a* of the supply platform 8. Such an arrangement of the sorting/selection device 16 relative to this first part 9*a* makes it possible for the latter to be able to discharge, from the upper face 11, the one or more components 2 for timepieces that do not have a correct orientation in order to be able to ensure the optimal seizure thereof by the gripping arm 10 when they are positioned in the distribution zone 13. Such a sorting/selection device 16 comprises at least one element for projecting/spraying a fluid, such as an air nozzle connected to an air compressor. In this device 3, a single air nozzle is arranged at the sorting/selection zone 26. In other words, this device 16 is able to direct a flow of fluid, such as air, towards the sorting/selection zone 26 of the upper face 11 of the first part 9*a*.

The device 3 also comprises a device 18 for protecting the component 2 for timepieces that is arranged in the distribution zone 13 in advance of the seizure thereof by the gripping arm 10. This protection device 18 also comprises at least one element for projecting/spraying a fluid, such as an air nozzle connected to an air compressor. In this device 3, this air nozzle is preferably close to a portion of the upper face 11 arranged between the sorting/selection zone 26 and the distribution zone 13 such as to be able to spray/project a stream of air into this portion when a component 2 for timepieces is arranged in the distribution zone 13. In other words, this device 18 is capable of directing a stream of fluid, such as air, towards this portion of the upper face 11.

This device 3 may also comprise a device 17 (not shown) for separating at least two components 2 for timepieces arranged above the distribution zone 13. This device 17 may comprise at least two flexible elements mounted on a fixed arm with the aim of positioning them above this distribution zone 13. More precisely, there may be three flexible elements, the free ends of which are positioned in order for there to be a gap between them that is smaller or substantially smaller than the greatest dimension of the component 2 for timepieces, in order to separate two of these components 2 for timepieces that might be adhering to one another on account of the oily matter with which they are totally or partially coated. In this context, after a separation, the component 2 for timepieces seized by the gripping arm 10 is then distributed in the automatic assembly installation 100 and the other component 2 for timepieces is directed towards the enclosure 4 of the device 3.

It will be noted that the use of air in the sorting/selection 16 and protection devices makes it possible to cause a component 2 for timepieces to move without suffering damage.

The sorting/selection 16 and separation 17 devices and protection device 18 are arranged on one and the same fixed arm.

In this system 1, as seen, the articulated gripping arm 10 is provided in order to distribute said components 2 for timepieces to said automatic assembly installation 100.

This system 1 also comprises a control unit 20 connected to the device 3, in particular to components of this device 3 such as the sorting/selection device 16, the separation device 17, the presence detector 14, the protection device 18 and the electromechanical elements 19.

This control unit 20 is also connected to the articulated gripping arm 10 and also to a device 22 for supplying the device 3 with components 2 for timepieces of this system 1. Such a control unit 20 may be a computer and comprises hardware and software resources, in particular at least one processor interacting with memory elements. This control unit 20 can execute instructions for implementing a computer program for monitoring these components of the device 3 and of the gripping arm 10 within the context of the distribution of these components 2 for timepieces in the automatic assembly installation 100.

It will furthermore be noted that the first passage zone 5a comprises a hatch 24 that makes it possible to close/open an opening made in the second inclined plane 6b involved in discharging the components 2 for timepieces from the vibrating device 3. The external surface of this hatch 24 comprises openings 27 provided in order to discharge dust and/or flakes.

In this context, this system 1 makes it possible to implement a method for controlled distribution of components 2 for timepieces. This method comprises a step of placing lightly oiled components 2 for timepieces to be distributed into the first compartment 4a of the device 3. In the course of this step, the control unit 20 then monitors the device 22 for supplying the device 3 with components 2 for timepieces. Next, in the course of a functioning step of the device 3, the control unit 20 activates the electromechanical elements 19 so as to cause the device 3 to vibrate relative to its fixed pedestal and to cause the travel of the components 2 for timepieces along, first, the first inclined plane 6a, then the first passage zone 5a and subsequently the second inclined plane 6b until they arrive, preferably one after another, on the upper face 11 of the supply platform 8. On the sorting/selection zone 26 of the upper face 11, these components 2 for timepieces are exposed to a stream of air coming from the sorting/selection device 16 of the device 3 which aims to separate those amongst them that do not have a correct orientation in advance of their seizure by the articulated gripping arm 10. The components 2 for timepieces that are in these conditions discharged from this upper face 11 are then directed systematically via the guide portions 15 of the supply platform 8 towards the base 23 of the second compartment 4b in order next to be directed, through the effect of the vibrations, towards the second passage zone 5b in order to be conveyed towards the first compartment 4a. The components 2 for timepieces that are still present on the upper face 11 and that thus have a correct orientation are, for their part, through the effect of the vibrations, conveyed one by one towards the distribution zone 13. In this context, when a component 2 for timepieces arrives in the distribution zone 13, the presence detector 14 identifies the positioning of the component 2 for timepieces in this zone 13 and transmits a signal to this effect to the control unit 20 that then triggers the process of seizure of this component 2 by the articulated gripping arm 10 in advance of its distribution in the automatic assembly installation 100 and triggering of the protection device 18 that projects/sprays a stream of air in the portion of the upper face 11 included between the sorting/selection zone 26 and the distribution zone 13 in order to discharge from this portion any component 2 for timepieces that might be likely to be directed towards this distribution zone 13 upon execution of the seizure process. It will advantageously be noted that such seizure of this component 2 for timepieces is thus achieved above or in the second compartment 4b of the device 3, making it possible, in the event of any fall of the component 2 for timepieces, that said component systematically returns to this second compartment 4b.

The invention claimed is:

1. A system for controlled distribution of components for timepieces, for an installation for automatic assembly of all or part of an article produced from at least one of said components, the system comprising:
   a vibrating device wherein said components are placed in bulk, which is provided with first and second compartments connected together at a first end by a first passage zone in which the first end of the first compartment is positioned above the first end of the second compartment such that the components from the first end of the first compartment fall into the first end of the second compartment, and the first and second compartments are connected together at a second end by a second passage zone in which the second end of the second compartment is positioned above the second end of the first compartment such that the components in the second end of the second compartment fall into to the second end of the first compartment to form a closed circuit wherein the components can flow continuously in the first and second compartments, and
   an articulated gripping arm provided to seize said components from a distribution zone positioned between the first and second passage zones to distribute said components to said automatic assembly installation,
   the vibrating device comprising first and second planes inclined in opposite directions included, respectively, in the first and second compartments, said components being able to progress along the first and second inclined planes towards a supply platform on which at least one component can be arranged in advance of its seizure by the articulated gripping arm, said supply platform being located in the second compartment at an exit of the second inclined plane.

2. The system according to claim 1, wherein the supply platform is arranged in the second compartment in the continuation of the second inclined plane while being mechanically connected to the second inclined plane.

3. The system according to claim 1, wherein the supply platform extends longitudinally between the exit of the second inclined plane and the second passage zone.

4. The system according to claim 1, wherein the supply platform comprises first and second parts.

5. The system according to claim 4, wherein the first part has:
   a length greater or substantially greater than a length of the second part, and
   a width smaller or substantially smaller than a width of the second part.

6. The system according to claim 4, wherein the first part comprises a planar upper face forming a support on which the components can move with a view to their seizure by an articulated gripping arm.

7. The system according to claim 4, wherein the first part extends in a rectilinear manner and an upper face of the first part is included in a plane comprising a planar surface of a second inclined plane.

8. The system according to claim 4, wherein the first part of the supply platform comprises an upper face provided with the distribution zone included substantially at its free end and a component is arranged in the distribution zone in advance of its seizure by an articulated gripping arm.

9. The system according to claim 8, wherein the upper face is at a different height relative to a base of the second compartment while being arranged in the second compartment above the base.

10. The system according to claim 4, wherein the first part of the supply platform comprises a device for detecting a presence of a component arranged in the distribution zone.

11. The system according to claim 1, wherein a second part of the supply platform comprises two guide portions.

12. The system according to claim 11, wherein the guide portions are defined in order to direct components towards lateral walls of the second compartment, at least one component initially present on a first part of said supply platform and discharged therefrom.

13. The system according to claim 1, wherein the vibrating device comprises a device for sorting/selecting components defined close to a first part of the supply platform, which is configured to direct a stream of fluid towards an upper face of the first part.

14. The system according to claim 1, wherein the vibrating device comprises a device for separating at least two components arranged above the distribution zone.

15. The system according to claim 1, wherein the first passage zone comprises the ends of the first and second compartments and also a difference in level present between the first and second inclined planes defined in these ends with the first inclined plane which is located above the second inclined plane.

16. The system according to claim 1, wherein the second passage zone comprises the ends of first and second compartments and also a difference in level present between the first inclined plane and a base defined in these ends with the base which is located above the first inclined plane.

17. The system according to claim 1, wherein the first passage zone comprises a hatch provided in order to close/open an opening made in the second inclined plane allowing discharge of the components from the vibrating device.

18. The system according to claim 1, wherein the component is selected from components comprising axisymmetric objects of millimetric size.

19. An installation for automatic assembly of all or part of an article produced from at least one component of a timepiece, comprising at least one system for controlled distribution of components according to claim 1.

* * * * *